March 4, 1941.    R. A. ANDREWS    2,234,104
ELECTRIC CONTROLLING APPARATUS
Filed April 16, 1940    2 Sheets-Sheet 2

INVENTOR
RUFUS A. ANDREWS
BY
Lawrence K. Sager
his ATTORNEY

Patented Mar. 4, 1941

2,234,104

UNITED STATES PATENT OFFICE 2,234,104

ELECTRIC CONTROLLING APPARATUS

Rufus A. Andrews, Mamaroneck, N. Y., assignor to Ward Leonard Electric Company, a corporation of New York Application April 16, 1940, Serial No. 329,847

14 Claims. (Cl. 171—119)

This invention relates to the control of voltage regulating apparatus for dynamo-electric machines having a field winding and particularly relates to switching means by which the control is changed from manual control to automatic regulation and from automatic regulation to manual control. Such control is convenient at times for replacement of parts or repair of the automatic regulating means and also may be used when placing machines in parallel and under various other conditions.

The particular form of the regulating apparatus forms no part of the present invention, although it is well adapted to particular types, such as those using electronic tubes and to various other forms. The change from automatic regulation to manual, or the reverse, should be accomplished by automatic switching devices so as to insure the making and breaking of the proper connections and the proper sequence of steps and of their timing in the change. It is also important in passing from one condition to the other that the voltage of the dynamo controlled should not be subjected to an objectional change.

In the pending application of Frank G. Logan, Serial No. 77,931, filed May 5, 1936, a form of automatic switch control is disclosed which secures proper action in passing from manual to automatic regulation but in changing from automatic control to manual control there is a momentary interval between the removal of the automatic control and the assumption of the manual control which results in a dip in voltage of the regulated machine; also in changing back to automatic control, the electronic tubes require reheating and the time thus occupied is sometimes inconvenient.

The main object of the present invention is to provide automatic switching means which will insure the proper sequence of steps and of their timing in passing from manual to automatic regulation and also in passing from automatic regulation to manual. Another object is to avoid the necessity of preheating the electronic tubes or conditioning of other parts in order to pass from manual to automatic regulation each time such change is made. Another object is to provide a simple and dependable form of switch controlling apparatus for accomplishing the desired results. Other objects and advantages will be understood from the following description and accompanying drawings which illustrate preferred embodiments of the invention.

Figure 1:
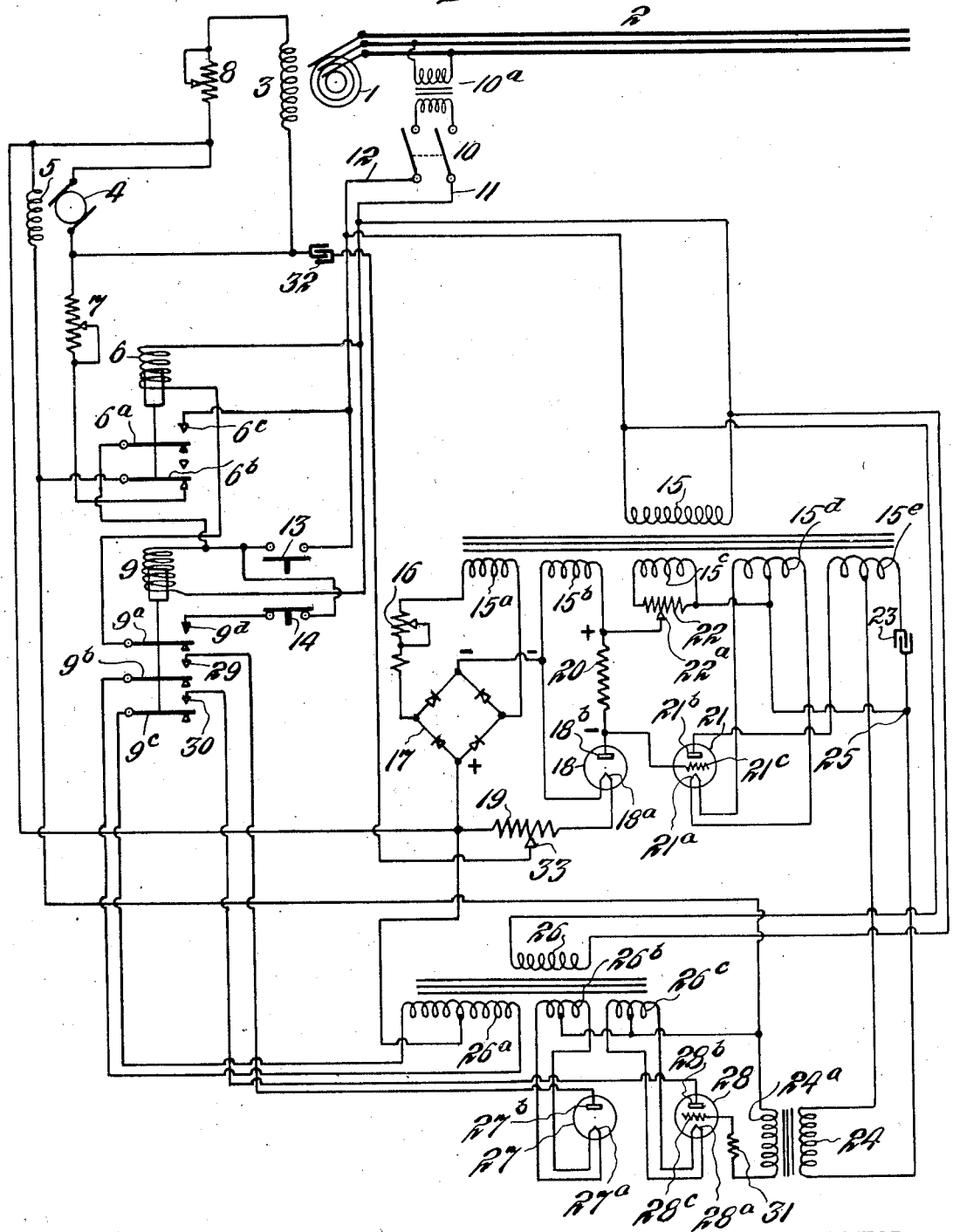
Figure 2:
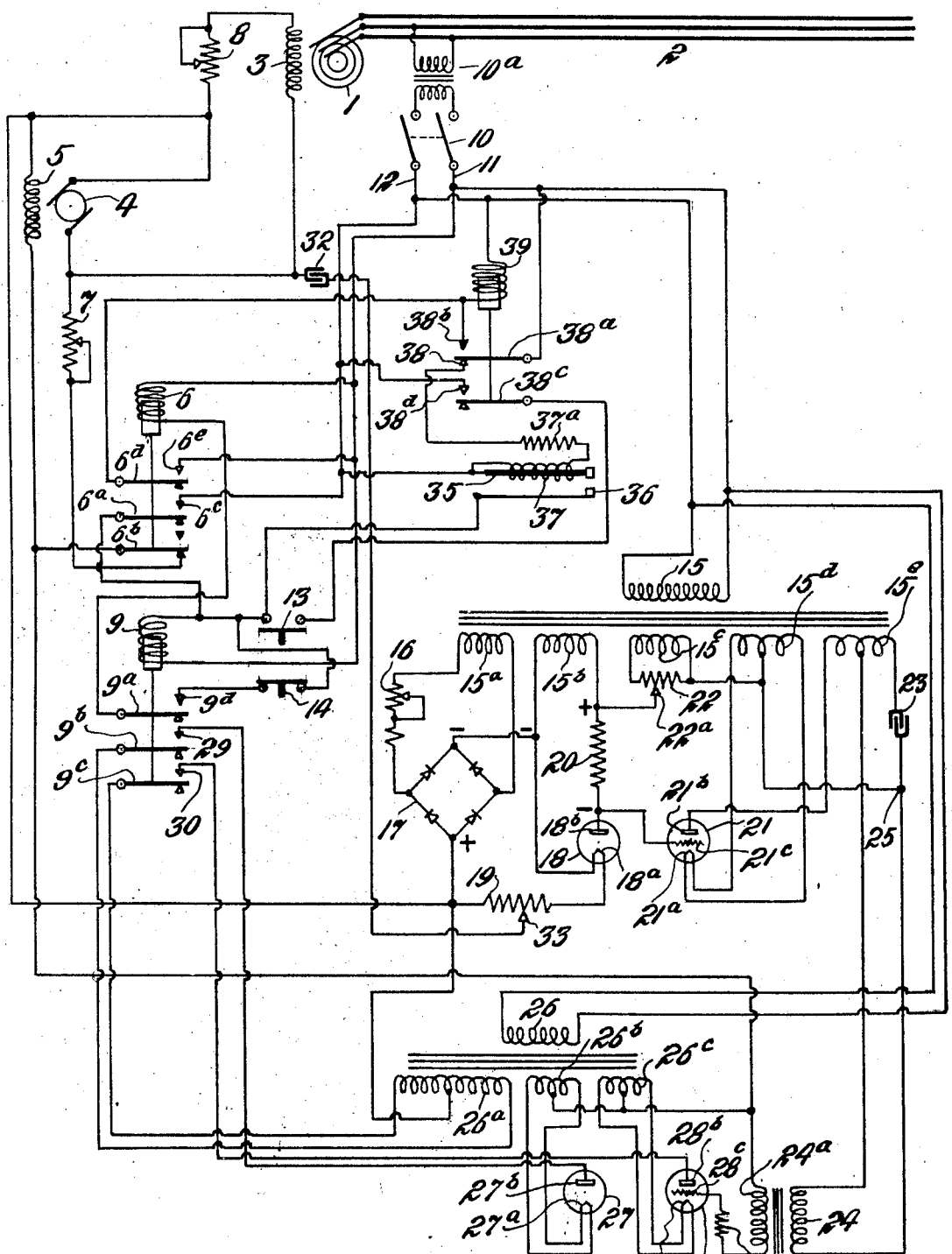

Fig. 1 is a diagram showing one embodiment of the invention; and Fig. 2 is a diagram showing another embodiment thereof.

Although this invention is applicable to various forms and types of automatic regulators it is well adapted for use in connection with the form of regulator disclosed in said pending application; and a description thereof is included herein in order to show one embodiment of this invention as applied thereto. The regulator described is for maintaining substantially constant the output voltage of an alternating current generator, regardless of change of load or other conditions which would affect the voltage. Referring to Fig. 1, a three-phase alternating current generator 1 is indicated delivering current to the supply mains 2. The field winding 3 of the generator is supplied with current from the armature 4 of an exciter having a field winding 5.

When the automatic regulation is not being used, a relay magnet coil 6 having two movable contacts 6a and 6b is deenergized and its movable contacts are in their lower position as shown engaging fixed contacts. The movable contact 6b is connected to one terminal of the exciter field winding 5 and its fixed contact is connected through a manually adjustable resistance to a terminal of the exciter armature 4, the other terminal of which is connected to a terminal of its field winding 5. Thus when the automatic regulation is not in use, the field winding of the exciter is connected through the resistance 7 in shunt to the armature 4, forming an auxiliary circuit for the field winding. Manual adjustment of the resistance 7 may be made to cause the exciter to deliver current to the field winding 3 of the generator of such value as will cause the alternator to generate a voltage of about the desired value. A manually adjustable resistance 8 is in series with the field winding 3 of the alternator for obtaining further desired adjustment of the generator voltage. Another magnetic relay for automatic control of the switching means is provided having a winding 9 and a plurality of movable contacts 9a, 9b and 9c. The movable contacts are adapted to engage fixed contacts as shown when the relay 9 is energized or deenergized, the position of the contacts being shown when the coil 9 is deenergized.

Across a pair of conductors of the three-phase generator is connected a transformer 10a, the secondary of which supplies current to a pair of leads 11 and 12 through a switch 10. When this switch is closed, a voltage is imposed upon the conductors 11 and 12 derived from and corresponding with the voltage, or change of voltage, of one phase of the alternator. The lead 12 is connected to one terminal of the winding 9 through a normally open pushbutton switch 13. This terminal of the winding 9 is also connected to the movable contact 6a of the magnet 6 and when the latter is energized, the contact 6a engages a fixed contact 6c which is connected to the line 12. One terminal of the winding 6 is connected to the line 11 and its other terminal connected to the movable contact 9a of the magnet 9. When the latter is energized, the contact 9a engages a fixed contact 9d which is connected through a normally closed pushbutton switch 14 to the upper terminal of the winding 9. The lower terminal of the winding 9 is connected to the lead 11 while its upper terminal, as already stated, is connected to a terminal of the normally open pushbutton switch 13, the other terminal of which is connected to lead 12.

At the right of the drawings is indicated a transformer having a primary winding 15 and several secondary windings 15a, 15b, 15c, 15d and 15e. The primary is connected across the leads 11 and 12 and when the switch 10 is closed, is subjected to the voltage derived from one phase of the generator. The secondary winding 15a is connected to opposite terminals, through an adjustable resistance 16, of a bridge-connected rectifier unit 17 indicated as having individual sections of the copper oxide type connected in the four branches of the bridge so as to give a positive and negative voltage across the other two terminals of the bridge. The resistance 16 is manually adjustable for the purpose of adjusting the output voltage of the generator 1 to give any desired constant voltage. From the upper negative terminal of the bridge 17, connection is made to the cathode 18a of a space discharge tube 18 having an anode 18b. From the cathode, or filament 18a, a return connection is made to the positive terminal of the bridge 17 through a resistance 19.

The secondary winding 15b of the transformer has one terminal connected to the filament 18a and the other terminal connected through a high resistance 20 to the plate 18b of the tube 18. It will thus be seen that any change in voltage of the generator 1 will be reflected in a corresponding change of voltage at the terminals of the bridge-connected rectifier 17 and in the value of the direct current delivered through the filament 18a and resistance 19. This change of current through the filament results in correspondingly changing its temperature. The change in temperature causes the resistance of the tube 18 to greatly change giving a greatly amplified variation in the resistance of the plate circuit of the tube upon slight change in voltage of the generator 1. The plate circuit is from one terminal of the secondary 15b through the high resistance 20 to the plate 18b, then to the filament 18a and back to the other terminal of the secondary 15b. The change in current through the high resistance 20 causes a corresponding change in the voltage drop in this resistance, resulting in the potential of the plate 18b being greatly changed in response to a slight departure from normal of the voltage of generator 1.

A three-element space discharge tube 21 is indicated having a cathode or filament 21a, a plate 21b and a grid 21c. The grid is electrically connected to a point between the plate 18b and a terminal of the resistance 20. Thus the grid 21c is subjected to the change of potential imposed upon this point in the manner just described. The secondary winding 15c has its terminals connected to a resistance 22 engaged by an adjustable contact 22a. This contact is connected to a point between one terminal of the secondary 15b and a terminal of the resistance 20. A terminal of the secondary 15c is connected to the mid-point of the secondary winding 15d, the terminals of which supply heating current to the filament 21a. Thus the grid circuit of tube 21 passes from the right-hand terminal of the secondary winding 15c to the mid-point of the secondary 15d and then from its outer terminals to the filament 21a, thence to the grid 21c and thence through resistance 20 to the contact 22a and then through the resistance 22 to the winding 15c. The connections are in such relation that the electromotive force imposed upon this grid circuit by the secondary winding 15c is in opposition as applied to the resistance 20, to the electromotive force across the resistance 20 due to the current in the plate circuit of the tube 18. The purpose of this opposing voltage applied to the resistance 20 is to bias the potential of the grid 21c so as to permit the filament 18a to work in a temperature range which gives the greatest response to change of current in this filament. Adjustment of the contact 22a may be made for imposing the proper bias potential on the grid 21c.

The secondary winding 15e has one terminal connected to the plate 21b of tube 21 while the other terminal is connected through a condenser 23 to one terminal of a primary winding 24 of an insulating transformer. The other terminal of this primary is connected to a mid-point of the secondary winding 15e; and the mid-point of secondary winding 15d is connected to a point 25 in the connection from the condenser 23 to the primary winding 24 of the transformer. It will thus be seen that the circuit from one lead of the secondary 15e passes through a condenser 23 of fixed capacity to the point 25 whereas the circuit from the other lead of the secondary 15e passes to the plate of the tube 21 and through the filament 21a to the secondary 15d and from its mid-point to the point 25. The resistance of this plate circuit varies greatly in response to change of potential of the grid 21c as controlled by the previously described apparatus; and this change of resistance in the plate circuit causes the phase of the potential between point 25 and the mid-tap of the winding 15e to greatly change with reference to the anode potential of a tube 28 in response to a small departure from normal of the voltage of the generator 1. This of course changes the phase of the electromotive force impressed upon the primary 24 of the insulating transformer and correspondingly changes the phase of the electromotive force of the secondary 24a.

Another transformer is shown in the lower portion of the drawing having a primary winding 26 and secondary windings 26a, 26b and 26c. The primary winding is connected across the leads 11 and 12. The secondary 26b has its terminals connected to the cathode 27a of a half-wave rectifier 27; and the secondary 26c has its terminals connected to the cathode 28a of the half-wave rectifier 28. The mid-point of the secondaries 26b and 26c are connected together and to one terminal of the secondary winding 24a and also to a terminal of the exciter field winding 5. The right-hand terminal of the secondary winding 26a is shown connected to the movable contact 9b of the relay controlled by the relay coil 9. When this coil is energized, the movable contact 9b is caused to engage the contact 29 which is connected to the anode 27b of the rectifier 27. The lefthand terminal of the secondary 26a is shown connected to the movable contact 9c of the relay and when the coil 9 is energized, the contact 9c engages the contact 30 which is connected to the anode 28b of the rectifier 28. The mid-point of the secondary 26a is connected to the exciter field winding 5 at the terminal where it is connected to a terminal of the exciter armature 4. The lead from the mid-point of the secondary 26a is electrically connected to a terminal of the resistance 19 so as to have a common potential therewith for the purpose hereinafter explained.

It is evident that the transformer in the lower portion of the drawings will supply the exciting current through the rectifiers to the field winding 5 of the exciter when the switch 10 is closed and the relay coils 6 and 9 are energized. Thus one supply circuit of the exciter winding 5 may be traced from the right-hand terminal of the secondary 26a to the movable contact 9b, contact 29 to anode 27b and then to the cathode 27a to the secondary 26b and thence from its mid-point to one terminal of the field winding 5 and thence back to the mid-point of the secondary 26a.

The circuit from the left-hand terminal of the secondary 26a may be traced to contact 9c, contact 30 and thence to anode 28b, thence to the cathode 28a and through the secondary 26c to a terminal of the field winding 5 and thence from its opposite terminal back to the mid-point of the secondary 26a. Thus the half-wave rectifiers 27 and 28 cooperate to alternately supply current to the exciter field winding 5. The rectifier 28 is provided with a grid 28c which is connected through a resistance 31 to one terminal of the secondary 24a of the insulating transformer, the other terminal of this secondary being connected to the mid-taps of the secondaries 26b and 26c. Thus there is imposed upon the rectifier 28 a grid circuit from the lower terminal of secondary 24a through resistance 31 to the grid 28c and thence to the cathode 28a and through the secondary 26c back to the other terminal of the secondary 24a. As already explained, the phase of the electromotive force of the secondary 24a is shifted widely with reference to the anode voltage of tube 28 in response to a slight change in voltage of the generator 1. This change in phase is imposed upon the grid circuit of tube 28 resulting in a change in output of the tube.

Shifting the phase of the potential of grid 28c with reference to that of the anode 28b in such direction that the effective controlling potential of the grid is quite negative with respect to the anode 28b results in a minimum amount of current flowing in the anode circuit of tube 28 and results in this tube supplying a small amount of current to the exciter field winding 5 during its half-wave period. This small current results in also causing the tube 27 to deliver a small current to the exciter field winding 5 during its half-wave operation. When the phase of the grid 28c is automatically shifted to cause its effective controlling potential to be less negative with respect to the anode 28b potential, the current supplied by the tube 28 to the exciter field winding is correspondingly increased during its active period and likewise causes an increase of current to be delivered to the exciter field winding by rectifier 27 during its half-wave operation. Thus there is not only a change in voltage and current supplied to the field winding of the exciter by the rectifier 28 caused by the shifting of the phase of the grid 28c circuit but there is also a change of voltage and current supplied to the field winding of the exciter by the rectifier 27 in response to the action of the rectifier 28. It is evident from the operation of the apparatus disclosed that a slight change in voltage of the generator results in very greatly amplified change in the voltage and current applied to the field winding of the exciter, giving a very pronounced counteracting effect upon the exciter field winding in response to any tendency of departure from normal voltage of the generator 1. Moreover by reason of the character of the apparatus utilized, the corrective effect applied to the field winding of the exciter is almost instantaneous in its action upon the occurrence of any slight departure from normal of the generator voltage, and the rate of change of the armature exciter voltage is determined by the adjustment of the hereinafter explained anti-hunting circuit which is dependent upon the electrical constants of the controlled machine. In this way correction of the controlled alternating current voltage is accomplished while maintaining the electrical stability of the system.

This corrective effect is so great that it would tend to over-correct the departure from normal voltage which in turn would result in a pronounced counteracting effect and cause hunting. There is therefore included the provision of an anti-hunting control. For this purpose a condenser 32 is connected between one terminal of the exciter armature 4 and the contact 33 which adjustably engages the resistance 19. This applies an electromotive force to a portion of the resistance 19 which is responsive to change of voltage of the exciter armature 4, by a circuit which passes from the lower positive terminal of the armature 4 through the condenser 32 to the contact 33 and through the left-hand portion of the resistance 19 back to the negative terminal of the armature 34. This momentary condenser discharge voltage impressed on the resistance 19 will act to oppose the voltage applied to resistance 19 by the bridge rectifier unit 17 when the voltage of the exciter armature 4 is rapidly decreasing. It will thus oppose and tend to choke the effect of the action of the control apparatus when it acts to decrease the voltage of the exciter and the voltage of the alternator 1. The opposition of this condenser discharge voltage to the voltage of the rectifier circuit will be apparent by noting that the circuit from the positive terminal of the rectifier unit 17 passes from left to right through the resistance 19 and through the tube 18, resistance 20, secondary winding 15b and then to the negative terminal of the rectifier unit 17; but the condenser voltage impressed on a portion of the resistance 19 when the voltage of the exciter armature is decreasing, is in opposition to the rectifier circuit voltage owing to the direction of discharge of the condenser 32. When however the control apparatus is acting to increase the voltage of the generator 1 by greatly raising the voltage applied to the exciter field winding, the resultant rapid increasing voltage of the exciter armature causes a voltage to be impressed by the condenser circuit on a portion of the resistance 19 in the opposite direction from that previously considered because the condenser is then being charged. In that event the condenser circuit voltage acts in a direction to aid the voltage of the circuit of the rectifier 17 and thus tends to counteract the action of the control apparatus in raising the voltage of the exciter armature. This counteracting effect of the anti-hunting means results from the rapid change of current in the field winding 5 of the exciter as affected by the control apparatus with the result that any change imposed in each direction is dampened and hunting is avoided. It will be appreciated that the opposing or aiding voltage resulting from the action of the condenser on the resistance 19, correspondingly affects the heating of the filament 18a and in that way dampens the change of current in the circuit of the rectifier 17 through the resistance 20. It will also be understood that by providing a direct current for this control circuit containing the resistance 20, it permits the action of the condenser circuit to act with or in opposition to the voltage of the direct current control circuit and thus serves to accomplish the damping of the attempted change in both directions, that is, when the voltage of the generator is to be raised as well as when it is to be lowered. Adjustment of contact 33 permits the anti-hunting effect to be made the proper amount for obtaining the best results.

Under prolonged manual control, the switch 10 is opened, and the relay coils 6 and 9 are de-energized. The contact 6b is then in its lower position as shown and the field winding 5 of the exciter is in shunt to the armature 4 through the field rheostat 7. The main field rheostat 8 of the main generator is manually adjusted to its proper amount and the field rheostat 7 of the exciter is likewise adjusted to its proper amount to give the desired generator voltage.

When automatic control for maintaining the generator voltage within close limits is desired, the switch 10 is first closed. This supplies current to the primary windings 15 and 26 of the transformers which results in the passage of heating currents through the filaments of the electronic tubes 18, 21, 27 and 28. Upon the expiration of a sufficient time interval for the proper heating of the tubes, the pushbutton switch 13 is closed momentarily and then allowed to open. Its closure connects the winding 9 across the leads 11 and 12 which energizes this relay and causes its movable contacts to be shifted from the position shown to engage the upper contacts. The raising of the contact 9a causes it to engage contact 9d which is connected through the switch 14 and switch 13 now closed to the lead 12 and thereby energizes the relay winding 6 by a circuit from the lead 12 through switches 13 and 14, contact 9a and thence through the winding 6 to the lead 11. The winding 6 then causes its movable contacts to be shifted from the position shown to engage their upper contacts. The contact 6a by engaging the contact 6c closes a circuit from the lead 12 through the contact 6a and thence through the winding 9 to the lead 11, thus serving to maintain the coil 9 energized after the switch 13 has opened.

The energizing of the coil 9 also causes the movable contacts 9b and 9c to engage the fixed contacts 29 and 30 which thereby causes the field winding 5 of the exciter to be supplied with current from the automatic control apparatus. This control is momentarily in parallel with the previously adjusted auxiliary control circuit as regards supplying current to the exciter field winding. Although the energization of the relay coil 9 causes the movable contact 9a to engage its upper contact and thereby connect the relay 6 across the leads 11 and 12, the action of the relay coil 6 is subsequent to that of relay 9 and thus will not break the auxiliary control circuit of the exciter field winding by raising the contact 6a, until a momentary period after the relay 9 has moved its contacts to the operating control position. Thus the circuit of the exciter field is not opened when making the transfer from manual to automatic operation. Upon the movement of the contact 6b by the relay 6, the exciter field winding is then subjected to automatic control only.

When it is desired to temporarily interrupt the automatic regulation for the replacement of a tube, or for any other reason, the pushbutton switch 14 is opened momentarily. This interrupts the circuit of the relay winding 6 without then affecting the circuit of the winding 9. However, the release of the contact 6b of the relay 6 closes the circuit of the exciter winding 5 through the manual rheostat 7 for the resumption of manual control, while the release of the contact 6a opens the circuit of the winding 9 permitting its movable contacts to be retracted. This action introduces another break in the circuit of the winding 6 between the contacts 9a and 9d so that the reclosing of switch 14 cannot energize winding 6 and also disconnects the automatic controlling apparatus from the field winding of the exciter by the separation of the contacts 9b and 9c from the contacts 29 and 30.

By this sequence of actions, the field circuit of the exciter is not opened in the transfer from automatic to manual control because the de-energizing of the relay 6 taking place prior to the deenergizing of the relay 9, the closing of the field circuit through the manual rheostat 7 takes place before the opening of the contacts which interrupt the circuits of the automatic regulator to the field winding 5. It has been found in practice that there is no objectionable dip in the voltage of the main generator when this change is made and it has been found by tests that the circuit of the field winding of the exciter is not interrupted. Thus by this invention, the proper sequence of steps is attained not only during the passage from manual to automatic regulation but also in the passage from automatic regulation to manual control. It will be understood that the relays are the usual forms of commercial relays with yieldable contacts and are indicated in the drawings in the manner shown merely for clearness and simplicity in following the circuit connections.

In this passage from automatic regulation to manual control, the switch 10 remains closed and the electronic tubes of the regulator are maintained heated and in condition for again assuming control at any time it is desired to pass from manual control to automatic regulation. Thus there is no delay in requiring the reheating of the tubes before the apparatus is ready for the change to automatic regulation. Thus when it is desired to pass from manual control to automatic control, it is merely necessary to close temporarily the pushbutton switch 13. The automatic regulation will then assume control in the manner already described by the action of the automatic switching means without opening the field circuit of the exciter.

In the disclosures of Fig. 1, the operator is depended upon to permit a proper time interval to elapse after the initial closing of switch 10 before temporarily closing the switch 13 in order to permit proper heating of the tubes before the automatic regulation is placed in control. In Fig. 2 automatic means is provided for insuring a proper time interval for heating the regulating apparatus after closing of the switch 10 and prevents the operator from changing to automatic regulation before the tubes have been properly heated. However, after the initial heating of the tubes, the operator is enabled to make the change from automatic regulation to manual control and the reverse, in the manner already described, the tubes being maintained heated in the meantime and avoiding the delay of reheating each time a change is made. In Fig. 2 the same reference characters designate the corresponding parts which have been described with reference to Fig. 1.

In Fig. 2 a time delay relay is introduced in the circuit of the relay coil 9 and the time element is shown in this instance as being a bi-metallic strip 35 which is connected to the lead 12 and its contact is adapted to engage the contact 36 which is connected to the winding 9 between one of its terminals and the switch 13. The strip 35 is adapted to be heated by a heating winding 37 connected at one terminal to the lead 12 and at its other terminal through a resistance 37a to a fixed contact 38 of another relay and thence through the movable contact 38a of the relay to the lead 11. The coil 39 of this relay is connected at one terminal to the lead 12 and at the other terminal to a movable contact 6d of the relay 6. When this relay is energized the contact 6d engages a contact 6e which is connected to the lead 11. The lower terminal of the relay coil 39 is also connected to a fixed contact 38b which is engaged by the movable contact 38a when this relay is energized, the latter being connected to line 11. Another movable contact 38c of this relay is connected to a terminal of the pushbutton switch 13; and when this relay is energized, the contact 38c engages the contact 38d which is connected to the lead 12.

When the manual switch 10 is open, all the parts assume the position shown in Fig. 2 and at this time the voltage of the generator is subjected to manual control or adjustment by the rheostat 7. The thermostatic switch is in its open position at this time. Upon the closing of the switch 10, current is supplied to the transformers of the regulating apparatus and the heating of the tubes is initiated. During the heating period the closing of the pushbutton switch 13 would have no affect because its circuit is open between the contacts 38c and 38d. The closing of switch 10 also initiates the heating of the bi-metallic switch 35 by a circuit from the lead 12 through the heating coil 37 and resistor 37a to contact 38 and then by the contact 38a to the lead 11. After a sufficient period for heating the tubes of the regulator, the thermostatic strip 35 will cause its contact to engage the contact 36 and thereby close a circuit from the lead 12 through the thermostatic switch and through the relay coil 9 to the lead 11. This energizes relay 9 and its contacts are moved to effect automatic regulation and also the contact 9a is caused to engage the contact 9d which, as already explained, serves to excite the relay winding 6. This then opens the circuit through the manual rheostat 7 and maintains the energization of the winding 9 through the action of the movable contact 6a, as already explained. The energizing of the winding 6 also causes its movable contact 6d to engage the contact 6e which closes a circuit from the lead 11 through the contact 6d and through relay winding 39 to the lead 12. This relay is then energized and causes the contact 38a to engage the contact 38b which closes its holding circuit through the coil 39 across the leads 11 and 12 which results in this relay being maintained energized even though the relay winding 6 may be deenergized. The energizing of the relay winding 39 opens the circuit of the heating coil 37 at the contact 38 which interrupts the heating current through the heating coil and thus keeps this circuit open as long as the switch 10 remains closed. This relay when energized also causes the contact 38c to engage the contact 38d which closes the connection from the lead 12 through these contacts to a contact of the pushbutton switch 13. After the circuit of the heater 37 is opened, the strip 35 cools and causes its contact to separate from contact 36.

If at any time it is desired to pass from automatic control to manual control, such as for the purpose of replacing a tube in the regulating apparatus, it is merely necessary to open the pushbutton switch 14 which deenergizes the relay winding 6 which in turn deenergizes the relay winding 9 and thereby transfers to manual control without causing any objectionable dip in the voltage of the generator, as already explained. The deenergizing of the relay windings 6 and 9 does not, however, cause the deenergizing of the relay winding 39 because that is maintained energized by the engagement of the contact 38a with the contact 38b; and it results that in passing to manual control in the manner just described, the heating coil 37 of the thermostatic switch is not subjected to any heating current because its circuit is maintained open by the relay winding 39. Therefore the thermostatic switch which opened after the discontinuance of its heating current by the energization of the winding 39, will not reclose under the assumed conditions.

When it is desired to resume automatic regulation, it is merely necessary to close the pushbutton switch 13 temporarily which will complete the circuit of the relay winding 9 from lead 12 through contacts 38d, 38c, switch 13 and thence through the winding 9 to the lead 11. The change of connections and sequence of steps then takes place in the manner already described, resulting in the passage from manual control to automatic regulation. When it is desired to remove the automatic regulation for a prolonged period, the switch 14 will first be opened for securing the sequence of changes in the manner already described and the switch 10 is then opened. The opening of the latter switch will deenergize the relay winding 39 and cause the parts to assume the position shown in Fig. 2. When it is desired to resume the automatic regulation, it is merely necessary to close the switch 10 which causes the passage of current to the heating elements of the regulating apparatus and to the thermostatic heating coil 37. After a proper heating period, the thermostatic switch will close which causes the resumption of the automatic regulation by the connections and sequence of steps already described.

It is apparent that this invention may be applied to various types and forms of regulating apparatus and to the control of circuits in various ways in passing from manual control to automatic regulation and the reverse; and various

I claim:

1. The combination of a dynamo-electric machine having a field winding, automatic means for controlling the current in said field winding and connected in series therewith, said field winding having an auxiliary open circuit, a manual switch, and automatic means controlled by said switch for first closing said auxiliary circuit and then opening the circuit to said automatic means.

2. The combination of a dynamo-electric machine having a field winding, automatic means for controlling the current in said field winding and connected in series therewith, said field winding having an auxiliary open circuit, a manual switch, relays controlled by said switch, one of said relays closing said auxiliary circuit and deenergizing another of said relays, the latter relay then opening the circuit to said automatic means.

3. The combination of a dynamo-electric machine having a field winding, automatic means for controlling the current in said field winding, said field winding having an auxiliary circuit, a relay when deenergized for closing the circuit of said field winding through said auxiliary circuit, a second relay when deenergized for opening the circuit between said field winding and said automatic means, a manual switch for energizing said second relay for closing the circuit between said field winding and said automatic means, connections for energizing the first named relay by the energization of said second relay and thereby causing said first named relay to open the circuit between said field winding and said auxiliary circuit, and connections for causing said second relay to be maintained energized by the energization of said first named relay after said manual switch has been opened.

4. The combination of a dynamo-electric machine having a field winding, automatic means for controlling the current in said field winding, said field winding having an auxiliary circuit, a relay when deenergized for closing the circuit of said field winding through said auxiliary circuit, a second relay when deenergized for opening the circuit between said field winding and said automatic means, a manual switch for energizing said second relay for closing the circuit between said field winding and said automatic means, connections for energizing the first named relay by the energization of said second relay and thereby causing said first named relay to open the circuit between said field winding and said auxiliary circuit, connections for causing said second relay to be maintained energized by the energization of said first named relay after said manual switch has been opened, and a second manual switch for deenergizing said first named relay which relay then deenergizes said second relay.

5. The combination of a dynamo-electric machine having a field winding, automatic means for controlling the current in said field winding, said automatic means requiring a time interval for attaining operating condition, said field winding having an auxiliary circuit, a relay when deenergized for closing the circuit of said field winding through said auxiliary circuit, a second relay when denergized for opening the circuit between said field winding and said automatic means, a switch for supplying energy to said automatic means and for preliminary conditioning of said automatic means, a manual switch for energizing said second relay for closing the circuit between said field winding and said automatic means, said manual switch deriving current from said first named switch, connections for energizing the first named relay by the energization of said second relay and thereby causing said first named relay to open the circuit between said field winding and said auxiliary circuit, and connections for causing said second relay to be maintained energized by the energization of said first named relay after said manual switch has been opened.

6. The combination of a dynamo-electric machine having a field winding, automatic means for controlling the current in said field winding, said automatic means requiring a time interval for attaining operating condition, said field winding having an auxiliary circuit, a relay when deenergized for closing the circuit of said field winding through said auxiliary circuit, a second relay when deenergized for opening the circuit between said field winding and said automatic means, a switch for supplying energy to said automatic means and for preliminary conditioning of said automatic means, a manual switch for energizing said second relay for closing the circuit between said field winding and said automatic means, said manual switch deriving current from said first named switch, connections for energizing the first named relay by the energization of said second relay and thereby causing said first named relay to open the circuit between said field winding and said auxiliary circuit, connections for causing said second relay to be maintained energized by the energization of said first named relay after said manual switch has been opened, and a second manual switch for deenergizing said first named relay which relay then deenergizes said second relay.

7. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic regulating means and for preliminary conditioning of said automatic means, a time delay relay supplied with energy from said switch, automatic switching means controlled by said relay for first closing the circuit between said field winding and said automatic regulating means and then opening the circuit between said field winding and said auxiliary circuit, and a manual switch for causing said switching means to first close the circuit between said field winding and said auxiliary circuit and then open the circuit between said field winding and said automatic regulating means.

8. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic regulating means and for preliminary conditioning of said automatic means, a time delay relay supplied with energy from said switch, automatic switching means controlled by said relay for first closing the circuit between said field winding and said automatic regulating means and then opening the circuit between said field winding and said auxiliary circuit, and a manual switch for causing said switching means to first close the circuit between said field winding and said auxiliary circuit and then open the circuit between said field winding and said automatic regulating means, said switching means including means for rendering said time delay relay ineffective until after said first named switch has been opened and reclosed.

9. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic regulating means and for preliminary conditioning of said automatic means, a time delay relay supplied with energy from said switch, automatic switching means controlled by said relay for first closing the circuit between said field winding and said automatic regulating means and then opening the circuit between said field winding and said auxiliary circuit, a manual switch for causing said field winding and said auxiliary circuit and then open the circuit between said field winding and said automatic regulating means, and a second manual switch for causing said switching means to first close the circuit between said field winding and said automatic regulating means and then open the circuit between said field winding and said auxiliary circuit independently of said time delay relay.

10. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic regulating means and for preliminary conditioning of said automatic means, a time delay relay supplied with energy from said switch, automatic switching means controlled by said relay for first closing the circuit between said field winding and said automatic regulating means and then opening the circuit between said field winding and said auxiliary circuit, a manual switch for causing said switching means to first close the circuit between said field winding and said auxiliary circuit and then open the circuit between said field winding and said automatic regulating means, and a second manual switch for causing said switching means to first close the circuit between said field winding and said automatic regulating means and then open the circuit between said field winding and said auxiliary circuit independently of said time delay relay, said switching means including means for rendering said second manual switch ineffective until after said time delay relay has actuated said switching means.

11. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic means and for preliminary conditioning of said automatic means, a relay when deenergized for closing the circuit of said field winding through said auxiliary circuit, a second relay when deenergized for opening the circuit between said field winding and said automatic means, a time delay relay supplied with energy by said switch and for energizing said second relay after a time interval from the closing of said switch, said second relay when energized closing the circuit between said field winding and said automatic means, connections for energizing the first named relay by the energization of said second relay and thereby causing said first named relay to open the circuit between said field winding and said auxiliary circuit, connections for causing said second relay to be maintained energized by energization of said first named relay after said time delay relay has been disconnected from said second relay, and a manual switch for deenergizing said first named relay which relay then deenergizes said second relay.

12. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic means and for preliminary conditioning of said automatic means, a relay when deenergized for closing the circuit of said field winding through said auxiliary circuit, a second relay when deenergized for opening the circuit between said field winding and said automatic means, a time delay relay supplied with energy by said switch and for energizing said second relay after a time interval from the closing of said switch, said second relay when energized closing the circuit between said field winding and said automatic means, connections for energizing the first named relay by the energization of said second relay and thereby causing said first named relay to open the circuit between said field winding and said auxiliary circuit, connections for causing said second relay to be maintained energized by energization of said first named relay after said time delay relay has been disconnected from said second relay, a manual switch for deenergizing said first named relay which relay then deenergizes said second relay, and a second manual switch for energizing said second relay independently of said time delay relay.

13. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic means and for preliminary conditioning of said automatic means, a relay when deenergized for closing the circuit of said field winding through said auxiliary circuit, a second relay when deenergized for opening the circuit between said field winding and said automatic means, a time delay relay supplied with energy by said switch and for energizing said second relay after a time interval from the closing of said switch, said second relay when energized closing the circuit between said field winding and said automatic means, connections for energizing the first named relay by the energization of said second relay and thereby causing said first named relay to open the circuit between said field winding and said auxiliary circuit, connections for causing said second relay to be maintained energized by energization of said first named relay after said time delay relay has been disconnected from said second relay, a manual switch for deenergizing said first named relay which relay then deenergizes said second relay, and a second manual switch for energizing said second relay independently of said time delay relay, said switching means including means for rendering said second manual switch ineffective until after said time delay relay has actuated said switching means.

14. The combination of a dynamo-electric machine having a field winding, automatic regulating means for controlling the current in said field winding, said automatic regulating means requiring a time interval for attaining operating condition, said field winding having an auxiliary circuit, a switch for supplying energy to said automatic means and for preliminary conditioning of said automatic means, a relay when deenergized for closing the circuit of said field winding through said auxiliary circuit, a second relay when deenergized for opening the circuit between said field winding and said automatic means, a time delay relay supplied with energy by said switch and for energizing said second relay after a time interval from the closing of said switch, said second relay when energized closing the circuit between said field winding and said automatic means, connections for energizing the first named relay by the energization of said second relay and thereby causing said first named relay to open the circuit between said field winding and said auxiliary circuit, connections for causing said second relay to be maintained energized by energization of said first named relay after said time delay relay has been disconnected from said second relay, a manual switch for deenergizing said first named relay which relay then deenergizes said second relay, said switching means including means for rendering said time delay relay ineffective until after said first named switch has been opened and reclosed, and a second manual switch for energizing said second relay independently of said time delay relay, said switching means including means for rendering said second manual switch ineffective until after said time delay relay has actuated said switching means.

RUFUS A. ANDREWS.